US011249836B2

(12) United States Patent
Al-Bahar et al.

(10) Patent No.: US 11,249,836 B2
(45) Date of Patent: Feb. 15, 2022

(54) AUTOMATED AGENT FOR PROACTIVELY ALERTING A USER OF L1 IT SUPPORT ISSUES THROUGH CHAT-BASED COMMUNICATION

(71) Applicant: MOVEWORKS, INC., Mountain View, CA (US)

(72) Inventors: Ahmed Al-Bahar, Mountain View, CA (US); Sadish Ravi, Fremont, CA (US); Sunil Nagaraj, Los Altos, CA (US); Dongxu Zhou, Redwood City, CA (US); Vaibhav Nivargi, Palo Alto, CA (US); Varun Singh, Mountain View, CA (US); Jiang Chen, Fremont, CA (US); Bhavin Nicholas Shah, Fremont, CA (US)

(73) Assignee: MOVEWORKS, INC., Mountain View, CA (US)

( * ) Notice: Subject to any disclaimer, the term of this patent is extended or adjusted under 35 U.S.C. 154(b) by 0 days.

(21) Appl. No.: 17/248,551

(22) Filed: Jan. 28, 2021

(65) Prior Publication Data

US 2021/0334156 A1    Oct. 28, 2021

Related U.S. Application Data

(63) Continuation of application No. 15/929,319, filed on Apr. 24, 2020, now Pat. No. 10,956,255.

(51) Int. Cl.
*G06F 11/07* (2006.01)
*G06F 40/35* (2020.01)
*G06N 20/00* (2019.01)

(52) U.S. Cl.
CPC .......... *G06F 11/0793* (2013.01); *G06F 40/35* (2020.01); *G06N 20/00* (2019.01)

(58) Field of Classification Search
CPC .... G06F 11/0793; G06F 11/079; G06F 11/30; G06F 11/07; G06F 40/35; H04L 41/0609; G06N 20/00; G06N 20/10; G06N 20/20
See application file for complete search history.

(56) References Cited

U.S. PATENT DOCUMENTS

| 8,326,794 B1 | 12/2012 | Wood et al. |
| 9,183,072 B1 | 11/2015 | Makuch et al. |
| (Continued) | | |

FOREIGN PATENT DOCUMENTS

WO    2020/006634 A1    1/2020

OTHER PUBLICATIONS

International Search Report and Written Opinion dated May 28, 2021, from the ISA/European Patent Office, for International Patent App. No. PCT/US2021/015684 (filed Jan. 29, 2021), 13 pgs.

(Continued)

*Primary Examiner* — Yolanda L Wilson
(74) *Attorney, Agent, or Firm* — Ascenda Law Group, PC

(57) ABSTRACT

An automated agent may communicate with a user via a chat channel to proactively alert the user of an L1 IT support issue. The L1 IT support issue may be determined based on monitoring indications of human-initiated activities maintained by a system of record, and may, prior to the automated agent's alert, be unknown to the user. In some instances, a natural language understanding (NLU) module may be used to identify an entity and intent from the indications of human-initiated activities, and the L1 IT support issue may be determined based on the determined entity and intent. After alerting the user of the L1 IT support issue, the automated agent may inform, via the chat channel, the user of a remediation step available to address the L1 IT support (Continued)

issue. Upon obtaining the user's permission, the automated agent may perform the remediation step to address the L1 IT support issue.

20 Claims, 11 Drawing Sheets

(56) References Cited

U.S. PATENT DOCUMENTS

| | | | |
|---|---|---|---|
| 9,992,338 B2 | 6/2018 | Eisner et al. | |
| 2004/0221120 A1 | 11/2004 | Abrashkevich et al. | |
| 2008/0162688 A1* | 7/2008 | Reumann | G06Q 10/10 709/224 |
| 2008/0263404 A1 | 10/2008 | Vidiyala | |
| 2009/0172475 A1 | 7/2009 | Hampton | |
| 2010/0057657 A1* | 3/2010 | Boothe | H04L 41/5074 706/46 |
| 2010/0100412 A1 | 4/2010 | Cases et al. | |
| 2010/0100824 A1 | 4/2010 | Bartolini et al. | |
| 2013/0046764 A1 | 2/2013 | Choi et al. | |
| 2014/0006861 A1 | 1/2014 | Jain et al. | |
| 2014/0201356 A1 | 7/2014 | Hung et al. | |
| 2016/0274961 A1* | 9/2016 | Thomas | G06F 40/30 |
| 2017/0102997 A1 | 4/2017 | Purushothaman et al. | |
| 2017/0192840 A1* | 7/2017 | Jeansonne | H04L 1/0061 |
| 2018/0012143 A1 | 1/2018 | Hansen et al. | |
| 2018/0121808 A1* | 5/2018 | Ramakrishna | G06F 11/0793 |
| 2018/0157983 A1 | 6/2018 | Guruswamappa et al. | |
| 2018/0189130 A1 | 7/2018 | Mowry et al. | |
| 2018/0203755 A1 | 7/2018 | Das et al. | |
| 2018/0285750 A1 | 10/2018 | Purushothaman et al. | |
| 2019/0050239 A1* | 2/2019 | Caldwell | G06F 11/079 |
| 2019/0132191 A1 | 5/2019 | Mann et al. | |
| 2019/0147111 A1* | 5/2019 | Choi | H04L 51/02 704/9 |
| 2019/0318204 A1 | 10/2019 | Mishra et al. | |
| 2019/0332481 A1 | 10/2019 | Kulick et al. | |
| 2019/0347282 A1* | 11/2019 | Cai | G06F 3/0482 |
| 2019/0355043 A1* | 11/2019 | Swierk | G06F 40/30 |
| 2020/0013098 A1 | 1/2020 | Schnitt | |
| 2020/0089561 A1* | 3/2020 | Laing | G06F 11/0793 |
| 2020/0192743 A1 | 6/2020 | Harper et al. | |

OTHER PUBLICATIONS

"A Proactive, Automated Approach to Service Resolution", CIO from IDG Communication Inc., retrieved Feb. 2020 from: https://bmchelix.cio.com/a-proactive-automated-approach-to-service-resolution/, 9 pages.
"Choose a proactive chatbot to engage your users!", livingactor, blog, retreived Mar. 20, 2020 from: https://corporate.livingactor.com/en/choose-proactive-chatbot-engage-users/, 5 pages.
"Everything you need to know about AIOPS", Moogsoft (2020), retrieved from: https://info.moogsoft.com/rs/092-EGH-780/images/moogsoft_everything_you_need_to_know_aiops.pdf, 15 pages.
"Getting Acquainted with Moogsoft AIOps Platform", Moogsoft (2020), Ebook, retrieved from : https://info.moogsoft.com/rs/092-EGH-780/images/moogsoft-ebook-getting-acquainted-with-aiops-platform.pdf, 32 pages.
"Human Resources: Key Automation Areas", 10xDS, downloaded Feb. 13, 2020 from https://www.10xds.com/solutions/human-resources-automation#ai, 5 pages.
"IT Support Transformed by Conversational Platforms", KLoBot (Jan. 11, 2019), retreived from: https://www.klobot.ai/wp-content/uploads/2019/11/AI-in-IT-platform-01-11-19.pdf, 6 pages.

"Nexthink Chatbot Integration: Using Digital Employee Experience data to drive a meaningful conversation", Nexthink (Jul. 2019), retrieved from: https://www.nexthink.com/wp-content/uploads/2019/07/Chatbot-Integration-Solution-Brief.pdf, 2 pages.
"PureEngage On-Premises Use Cases: Genesys Predictive Chatbots (CE37) for PureEngage", Genesys (Feb. 10, 2020), 6 pages.
"Send proactive notifications to users", Microsoft Docs (Jan. 24, 2020), retrieved from: https://docs.microsoft.com/en-us/azure/bot-service/bot-builder-howto-proactive-message?view=azure-bot-service-4.0&tabs=csharp, 7 pages.
Ash, Marcus, "Cortana reminds you of the important stuff—even when you forget to ask", Microsoft, Windows Experience Blog (Feb. 9, 2017), retrieved from: https://blogs.windows.com/windowsexperience/2017/02/09/cortana-reminds-important-stuff-even-forget-ask/#mep2QbgrpczWWm5q.97, 6 pages.
Broadhead, Alan, "Reactive to proactive to predictive—the new IT user support paradigm: Understanding a new support strategy", DXC.technology, White Paper (Sep. 2017), 7 pages.
Col; et al., "Automate Your Enterprise IT Support With Intelligent RPA and Conversational AI Bots", Digitalist Magazine (Aug. 20, 2019), retrieved from: https://www.digitalistmag.com/cio-knowledge/2019/08/20/automate-your-enterprise-it-support-with-intelligent-rpa-conversational-ai-bots-06200148, 8 pages.
Faiq, Abbas, A community helping CIOs and IT leaders solve problems, The Enterprisers Project (May 2, 2019), retrieved from: https://enterprisersproject.com/article/2019/5/ai-chatbots-it-support, 4 pages.
Gokulnatha, Srikant, "Using AI to shift from reactive to proactive major incident management", Numerify (Dec. 9, 2019), retrieved from: https://www.numerify.com/blog/ai-shift-reactive-to-proactive-major-incident-management/, 10 pages.
Holloran, Dan, "Making the Most of Machine Learning for Incident Management", VictorOps, blog (Sep. 10, 2019), retrieved from: https://victorops.com/blog/machine-learning-for-incident-management, 7 pages.
Nadivi, Guy, "How to Predict and Remediate IT Incidents Before They Affect Business Outcomes [Webinar Recap]", Ayehu (Oct. 18, 2019), retrieved from: https://ayehu.com/how-to-predict-and-remediate-it-incidents-before-they-affect-business-outcomes-webinar-recap/, 10 pages.
Pascual, Federico, "Introduction Ticket Routing with AI", MonkeyLearn, Blog (Oct. 16, 2019), retrieved from: https://monkeylearn.com/blog/ticket-routing/, 13 pages.
Shah, Amit, "How Does a System of Record Fit Into a System of Intelligence?", Numberify (May 30, 2018), retrieved from: https://www.numerify.com/blog/system-of-intelligence-not-a-system-of-record/, 9 pages.
Sipos; et al., "Log-based Predictive Maintenance", KDD'14, Aug. 24-27, 2014, New York, NY, pp. 1867-1876.
Srikanth, Akshaya, "How to Improve Chatbot Conversation Strategy", freshworks, freshdesk blog, retrieved Feb. 12, 2020 from: https://freshdesk.com/self-service-portal/improve-chatbot-conversation-blog/https://freshdesk.com/self-service-portal/improve-chatbot-conversation-blog/, 16 pages.
Notice of Allowance dated Nov. 12, 2020, for U.S. Appl. No. 15/929,319, filed Apr. 24, 2020, 5 pgs.
Amendment filed Oct. 15, 2020, for U.S. Appl. No. 15/929,319, filed Apr. 24, 2020, 8 pgs.
Non-Final Office Action dated Sep. 29, 2020, for U.S. Appl. No. 15/929,319, filed Apr. 24, 2020, 8 pgs.
Non-Final Office Action dated Nov. 24, 2021, from U.S. Appl. No. 17/178,567, filed Feb. 18, 2021, 13 pgs.

* cited by examiner

AUTOMATED AGENT FOR PROACTIVELY ALERTING A USER OF L1 IT SUPPORT ISSUES THROUGH CHAT-BASED COMMUNICATION

RELATED APPLICATIONS

This application is a Continuation Application of U.S. application Ser. No. 15/929,319, (now issued as U.S. Pat. No. 10,956,255) filed on 24 Apr. 2020, incorporated by reference herein.

FIELD OF THE INVENTION

The present invention relates to the use of an automated agent to proactively alert a user of an L1 information technology (IT) support issue, and more particularly, relates the use of chat-based communication between the automated agent and the user to alert the user of the L1 IT support issue.

BACKGROUND

Typically, a user encounters an L1 IT support issue and contacts the IT department of an enterprise for assistance on resolving the issue. An L1 information technology (IT) support issue may include basic IT support issues, such as unlocking a user account (i.e., resetting a user's login id and/or password), installing software updates, etc., and may include the creation of an IT ticket.

As some context, L1 IT support issues is one category of a larger categorization of IT support issues, which also include L2 or L3 IT support issues. Generally, L2 or L3 IT support issues require more advanced remediation measures than L1 IT support issues. An L2 support issue typically requires the assistance of an IT support representative with an in-depth understanding of the processes performed by a product or service. An L3 support issue typically requires the assistance of the architects and/or engineers who created the product or service, and may require code-level changes.

Described herein are techniques for improving the handling of L1 IT support issues.

SUMMARY OF THE INVENTION

In one embodiment of the invention, an automated agent may communicate with a user via a chat channel to proactively alert the user of an L1 information technology (IT) support issue. The L1 IT support issue may, prior to the automated agent's alert, be unknown to the user. The L1 IT support issue may be determined by the automated agent based on indications of human-initiated activities that are maintained by a system of record. Examples of indications of human-initiated activities may include fields or data stored on the system of record (e.g., a login attempt, an IT ticket, a failure log, etc.).

In many cases, the L1 IT support issue may not be explicitly stated in the indications of human-initiated activities, and an analysis of the indications of human-initiated activities may be performed in order to determine the L1 IT support issue. In some cases in which the indications of human-initiated activities include natural language text, a natural language understanding (NLU) module may be used to identify an entity and intent from the indications of human-initiated activities, and the L1 IT support issue may be determined based on the determined entity and intent.

In addition to alerting the user of the L1 IT support issue, the automated agent may inform, via the chat channel, the user of a remediation step available to address the L1 IT support issue. Upon obtaining the user's permission, the automated agent may perform the remediation step to address the L1 IT support issue.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
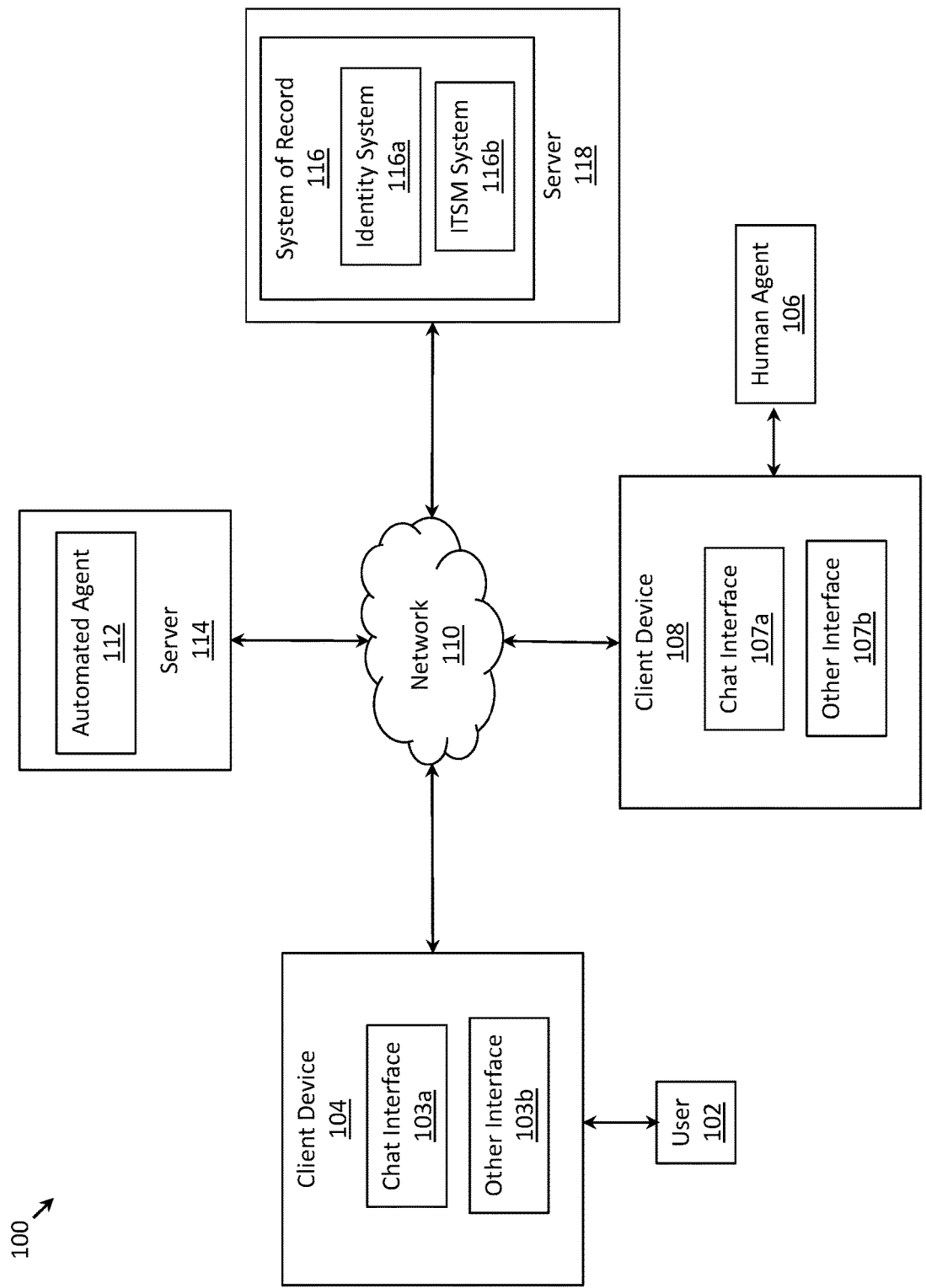
FIG. 1 depicts a system diagram with one or more client devices communicatively coupled to an automated agent and a system of record instantiated on one or more servers, in accordance with one embodiment of the invention.

FIG. 1 depicts system diagram 100 with one or more client devices (e.g., 104, 108) communicatively coupled to automated agent 112 and system of record 116 instantiated on one or more servers (e.g., 114, 118) via network 110. Network 110 may be any form of communications means and, in some cases, may be individual communications links, or one or more communications networks, including private networks, public networks, and/or virtual private networks over public networks. While servers 114 and 118 are depicted as two separate severs, it is possible for servers 114 and 118 to be part of one physical device.

User 102 may use client device 104 to communicate with automated agent 112 (e.g., a chatbot, a bot, etc.). In the preferred embodiment, user 102 communicates with automated agent 112 via a chat channel provided by chat interface 103a. A chat interface may be provided by a software application, may be embedded within a webpage, and/or may be provided by the operating system of client device 104 (e.g., may be an SMS chat interface provided by the iOS® or Android® operating system). While the preferred form of communication between user 102 and automated agent 112 is chat, it is also possible for user 102 to communicate with automated agent 112 via a communication channel provided by a user interface 103b other than chat interface 103a. Such a user interface 103b may be provided by an email application, a video-conference application, etc.

User 102 may also use client device 104 to communicate with system of record 116. A system of record generally captures interactions between people (e.g., email, chat, etc.), and between people and machines (e.g., searches submitted on a search engine, products ordered on an e-commerce site, etc.). One example of a system of record is an identity system 116a (e.g., from Okta, Inc.® of San Francisco, Calif.; from SailPoint, Inc.® of Austin, Tex.; from CyberArk® of Newton, Mass.; etc.). Identity system 116a may be used to store information associated with the identity of user 102, such as a login/password combination, a fingerprint (or other biometric data), an address, a date of birth, government identification information (e.g., a driver license number, passport number, social security number), gender, race, age, etc. Another example of a system of record is an information technology system management (ITSM) system 116b (e.g., from ServiceNow® of Santa Clara, Calif.). An ITSM system may be used to store and service IT tickets, and perform other IT related tasks. Another example of a system of record is a configuration management database (not depicted), which is used to store information regarding software and hardware assets, including the relationships between the assets.

In the preferred embodiment, user 102 communicates with system of record 116 via a communication channel provided by interface 103b. For instance, user 102 may submit an IT ticket to system of record 116 via a webform, or update login credentials stored at system of record 116 via a user interface provided by a software application. While the primary form of communication between user 102 and system of record 116 is a channel other than a chat channel, it is also possible for user 102 to communicate with system of record 116 via a chat channel provided by chat interface 103a.

Human agent 106 may similarly communicate with automated agent 112 and system of record 116 via client device 108. Similar to client device 104, client device 108 may also have a chat interface 107a and an interface 107b other than the chat interface. In one embodiment, human agent 106 may be an IT professional of an enterprise, whereas user 102 may be an employee of the enterprise.

Figure 2:
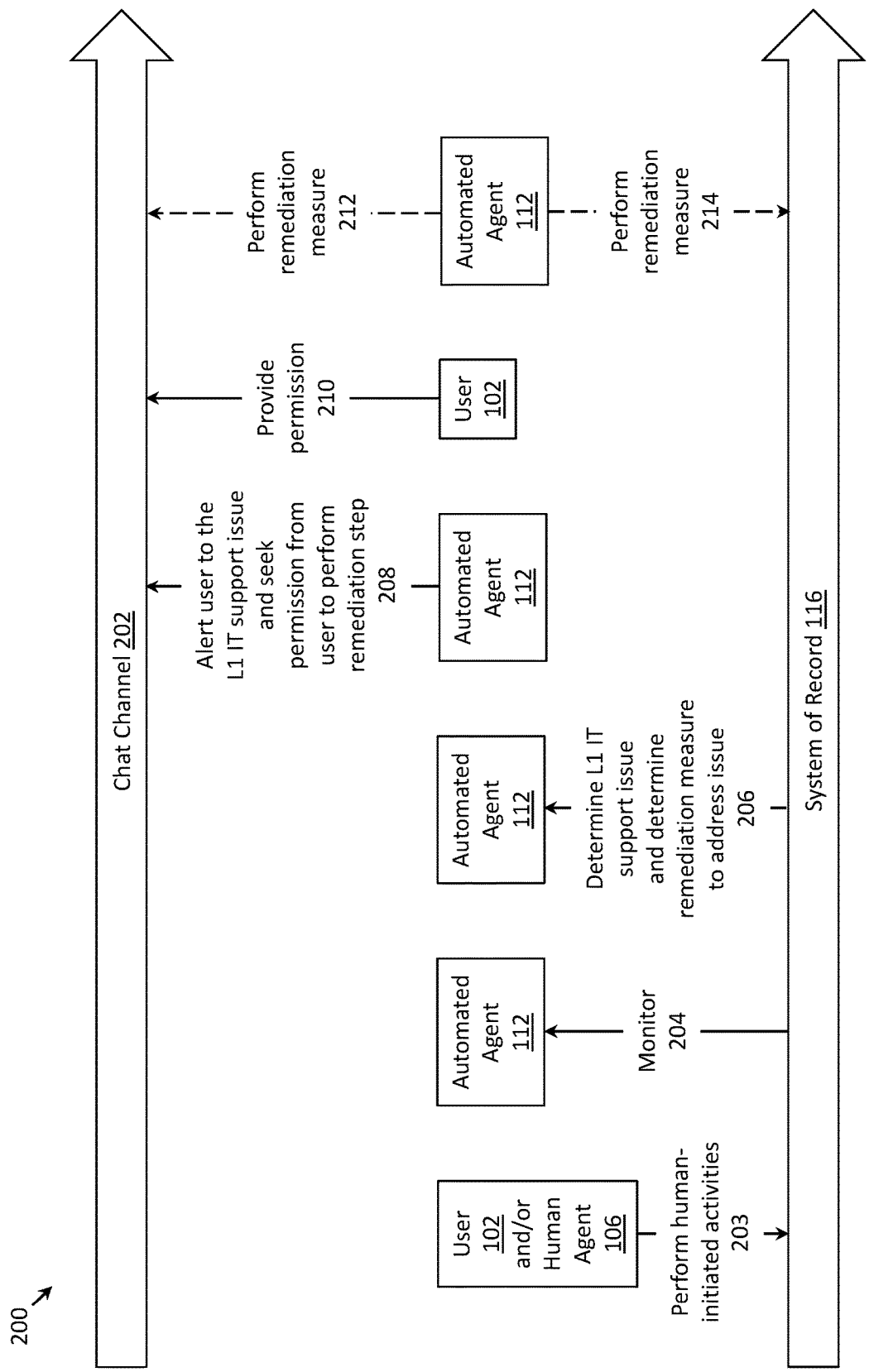
FIG. 2 depicts a sequence diagram in which an automated agent contacts a user on a chat channel to proactively alert the user of an L1 information technology (IT) support issue that is determined by monitoring human-initiated activities on a system of record, in accordance with one embodiment of the invention.

FIG. 2 depicts sequence diagram 200 in which automated agent 112 contacts user 102 on chat channel 202 to proactively alert user 102 of an L1 information technology (IT) support issue that is determined by monitoring human-initiated activities on system of record 116. In some instances, automated agent 112 may also perform a remediation measure to resolve the L1 IT support issue (with or without actions from the user).

At step 203, user 102 and/or human agent 106 may perform human-initiated activities that result in indications of human-initiated activities being recorded on system of record 116. The human-initiated activities may include sending an IT ticket, replying to an IT ticket, submitting valid login credentials, submitting invalid login credentials, submitting a request to access a computer network, etc. The indications of the human-initiated activities may include fields or data stored on the system of record (e.g., a login attempt, an IT ticket, a failure log, etc.). Many additional examples of human-initiated activities will be provided below in FIGS. 3-10.

At step 204, automated agent 112 may monitor system of record 116. In one embodiment, system of record 116 may be instrumented to provide data signals that indicate changes occurring on the system of record. Such instrumentation may be provided by system of record 116 via an application programming interface (API) (e.g., a RESTful API). In other instances, no API may be provided by system of record 116 and an agent (e.g., a software component) may be deployed behind a firewall protecting the system of record 116 so as to monitor changes to system of record 116. If system of record 116 is embodied as a structured document with fields, changes in the fields may be monitored by automated agent 112. If system of record 116 stores log files (e.g., structured or unstructured), the log files may be monitored for events and any associated values.

At step 206, automated agent 112 may determine an L1 IT support issue (more generally, at least one L1 IT support issue) based on the monitored data signals. More specifically, automated agent 112 may determine the L1 IT support issue by accessing a lookup table to map the indications of human-initiated activities to an L1 IT support issue. In addition or alternatively, a machine learning module (not depicted) may be trained with labeled data (i.e., indications of human-initiated activities that are mapped to L1 IT support issues), and the trained machine learning module may be used by automated agent 112 to determine an L1 IT support issue based on the indications of human-initiated activities.

In step 206, automated agent 112 may also determine a remediation measure (more generally, at least one remediation measure) to address the L1 IT support issue by accessing a lookup table to map the L1 IT support issue to a remediation measure. In addition or alternatively, a machine learning module (not depicted) may be trained with labeled data (i.e., L1 IT support issues that are mapped to remediation measures), and the trained machine learning module may be used by automated agent 112 to determine a remediation measure to address the L1 IT support issue.

At step 208, automated agent 112 may post a message on chat channel 202 that alerts user 102 to the L1 IT support issue, and additionally, may seek permission from the user to perform the remediation measure. At step 210, user 102 may provide permission for automated agent 112 to perform the remediation measure. While not depicted, it is also possible for user 102 to decline the assistance of the automated agent. Next, automated agent 112 may perform the remediation measure. The remediation measure may include automated agent 112 communicating (step 212) with user 102 via chat channel 202 (e.g., obtaining a new password from the user via chat channel 202). In addition or alternatively, the remediation measure may include communicating (step 214) with the system of record (e.g., communicating the new password from the user to the system of record). In addition or alternatively, the remediation measure may include communication with an entity not depicted in FIG. 2. For instance, automated agent 112 may communicate with the user's supervisor to authorize the purchase of a new laptop.

Figure 3:
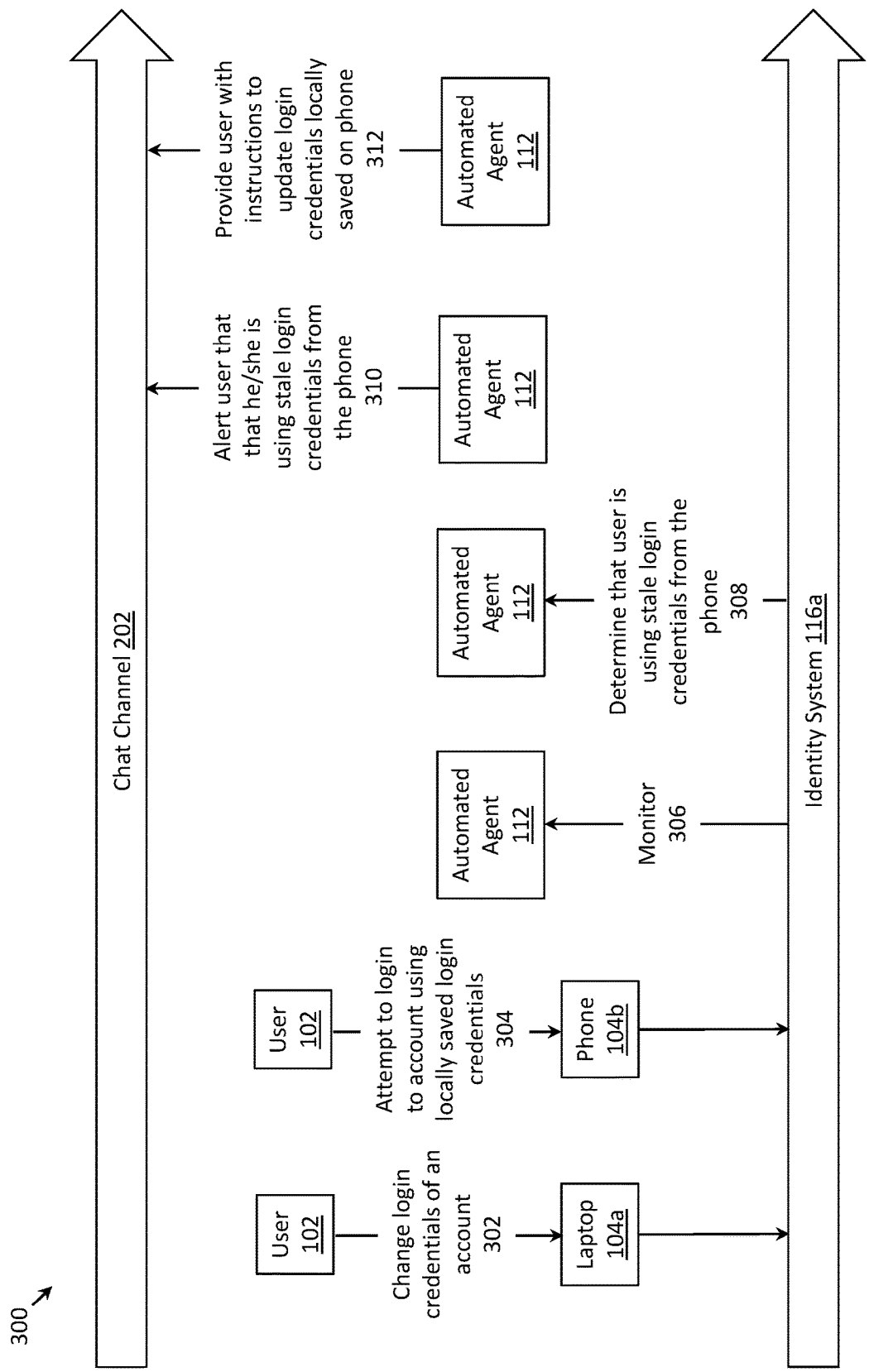
FIG. 3 depicts a sequence diagram in which an automated agent proactively alerts, on a chat channel, a user that login credentials of an account are not synchronized between two client devices of the user, in accordance with one embodiment of the invention.

Specific examples of sequence diagram 200 will be provided in FIGS. 3-10 below. While many of the examples closely track sequence diagram 200, some of the examples may deviate therefrom. FIG. 3 depicts sequence diagram 300 in which automated agent 112 proactively alerts, on chat channel 202, user 102 that login credentials are not synchronized between two client devices (e.g., a laptop and a smartphone) of the user.

At step 302, user 102 may change the login credentials (e.g., a password) of a cloud-based account (e.g., Gmail® account, Microsoft® 365 account, etc.) using a first client device 104a (e.g., a laptop). Further at step 302, a record of the updated login credentials may be stored at identity system 116a. At step 304, user 102 may attempt to login to the cloud-based account using login credentials that are locally saved at a second client device 104b. However, the locally saved login credentials are stale, due to the change to the login credentials made at the first client device 104a, so this login attempt from the second client device 104b results in a failure message being communicated to the user by identity system 116a.

At step 306, automated agent 112 may monitor identity system 116a and detect the recent update to the login credentials using first client device 104a, and the use of stale login credentials to login from second client device 104b. At step 308, based on the monitored indications of human-initiated activities, automated agent 112 may determine the L1 IT support issue that the user is attempting to login using stale login credentials (e.g., assume that identity system 116a keeps a record of passwords previously registered with the user's cloud-based account). At step 310, automated agent 112 may alert, via chat channel 202, the user that he/she is using stale login credentials to login to the account from second client device 104b. The chat channel 202 may refer to a chat interface on the second client device 104b (assuming the user is still actively using device 104b). Alternatively or in addition, the chat channel 202 may refer to a chat interface on first client device 104a (assuming the user is still actively using device 104a). While not depicted in FIG. 3, automated agent 112 may further ask the user, via chat channel 202, whether locally saved login credentials were used to login to the account. If the user replies in the affirmative, automated agent 112 may provide (at step 312) the user with instructions to update the locally saved login credentials at the second client device 104b. The example of FIG. 3 illustrates that a chat channel can be used by an automated agent to alert a user that he/she is using stale login credentials, which may be convenient as some users may experience a lockout event and not realize the reason for the lockout.

Figure 4:
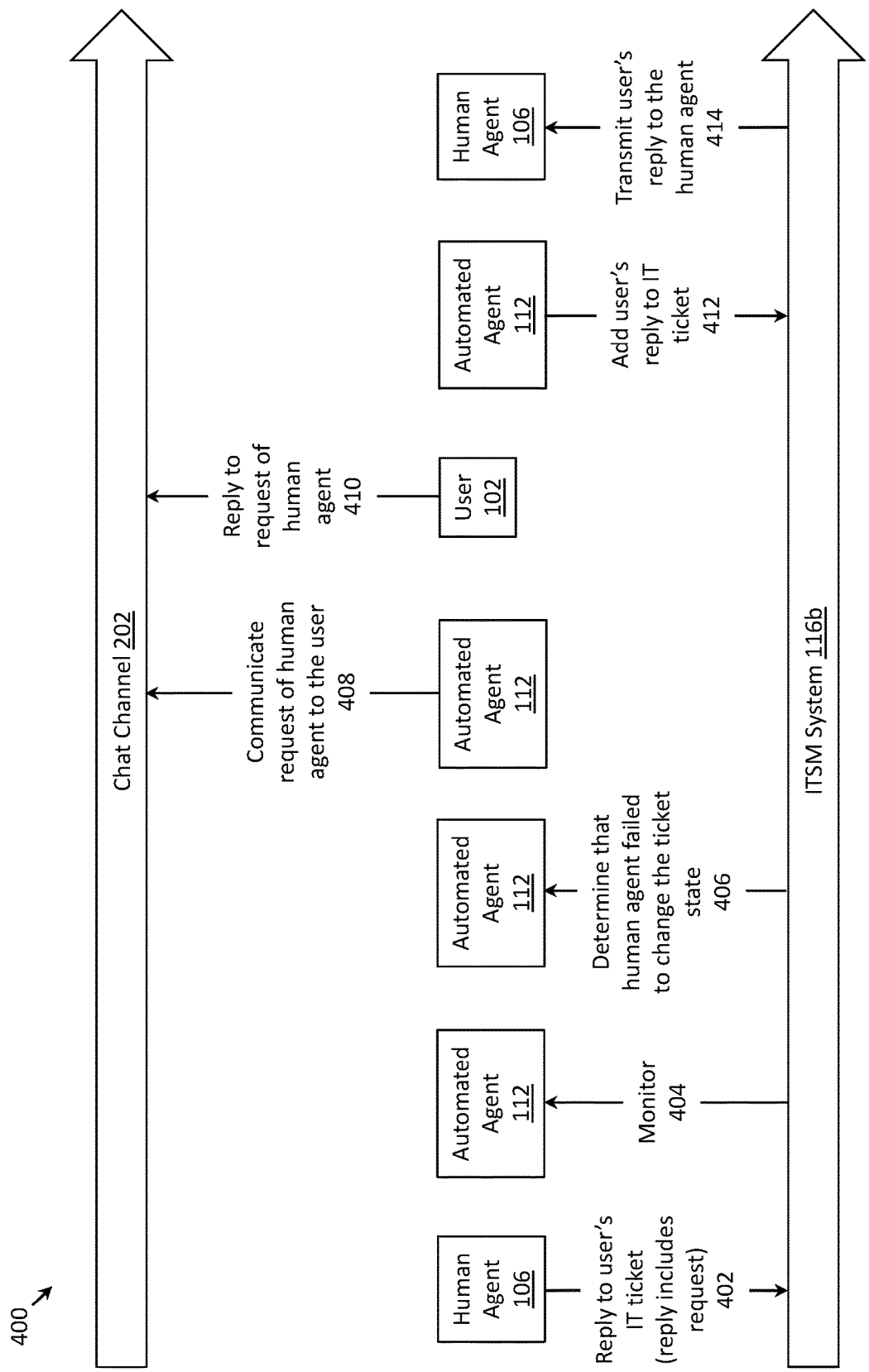
FIG. 4 depicts a sequence diagram in which an automated agent proactively alerts, on a chat channel, a user that a response to a message from a human agent is needed, in response to identifying a message addressed to the user from the human agent on an IT service management (ITSM) system, in accordance with one embodiment of the invention.

FIG. 4 depicts sequence diagram 400 in which automated agent 112 proactively alerts, on chat channel 202, a user that a response to a message from human agent 106 is needed, in response to identifying a message addressed to user 102 from the human agent on ITSM system 116b.

At step 402, human agent 106 may reply to a user's IT ticket (e.g., using a non-chat based communication channel of an ITSM application), and further the reply may include a request from the human agent to the user. For example, the IT ticket may be a request to purchase toner for a printer, and the human agent's message may ask the user whether overnight or two-day shipping is desired for the toner. Importantly, in the example of FIG. 4, the human agent forgets to change the ticket state, which means that the human agent's message is transmitted to ITSM system 116b, but not from ITSM system 116b to user 102. Therefore, human agent 106 may be waiting for a response from user 102, without realizing that the user never received his/her message.

At step 404, automated agent 112 may monitor for indications of human-initiated activities on ITSM system 116b (e.g., a reply to an IT ticket from human agent 106). At step 406, automated agent 112 may determine an L1 IT support issue based on the human agent's reply. More specifically, automated agent 112 may determine an intent and an entity associated with the human agent's message with the assistance of a natural language understanding (NLU) module. Example NLU modules include the Moveworks AI platform from Moveworks, Inc.® of Mountain View, Calif.; DialogFlow from Alphabet Inc.® of Mountain View, Calif.; and Language Understanding (LUIS) from Microsoft Corp.® of Redmond, Wash. In the instant example, the intent may be determined as "request shipping speed" and the entity may be determined as "printer supplies". In response to determining that the human agent is requesting the shipping speed of printer supplies and further that the state of the IT ticket was not changed by the human agent, automated agent 112 may determine the L1 information technology (IT) support issue of "failure to change ticket state" based on the identified intent and entity, and surrounding context of the human agent's message.

At step 408, automated agent 112 may post a message on chat channel 202 that communicates the message of the human agent to the user, and further alerts the user that the human agent is waiting for a response from the user (e.g., "Bob from helpdesk is waiting for your response in connection with ticket no. XYZ—Bob asked 'Do you want overnight or two-day shipping?'"). At step 410, user 102 may post a message on chat channel 202 that replies to the human agent's message (e.g., "Two-day shipping is fine").

At step 412, automated agent 112 may add the user's reply to the IT ticket (e.g., by transmitting the user's reply to ITSM system 116b). Finally, at step 414, the user's message may be transmitted to human agent 106 from the ITSM system 116b using a non-chat based communication channel of an ITSM application. The example of FIG. 4 illustrates that a chat channel can be used by an automated agent to relay a message from a human agent to the user, in the scenario that the message from the human agent fails to reach the user.

Figure 5:
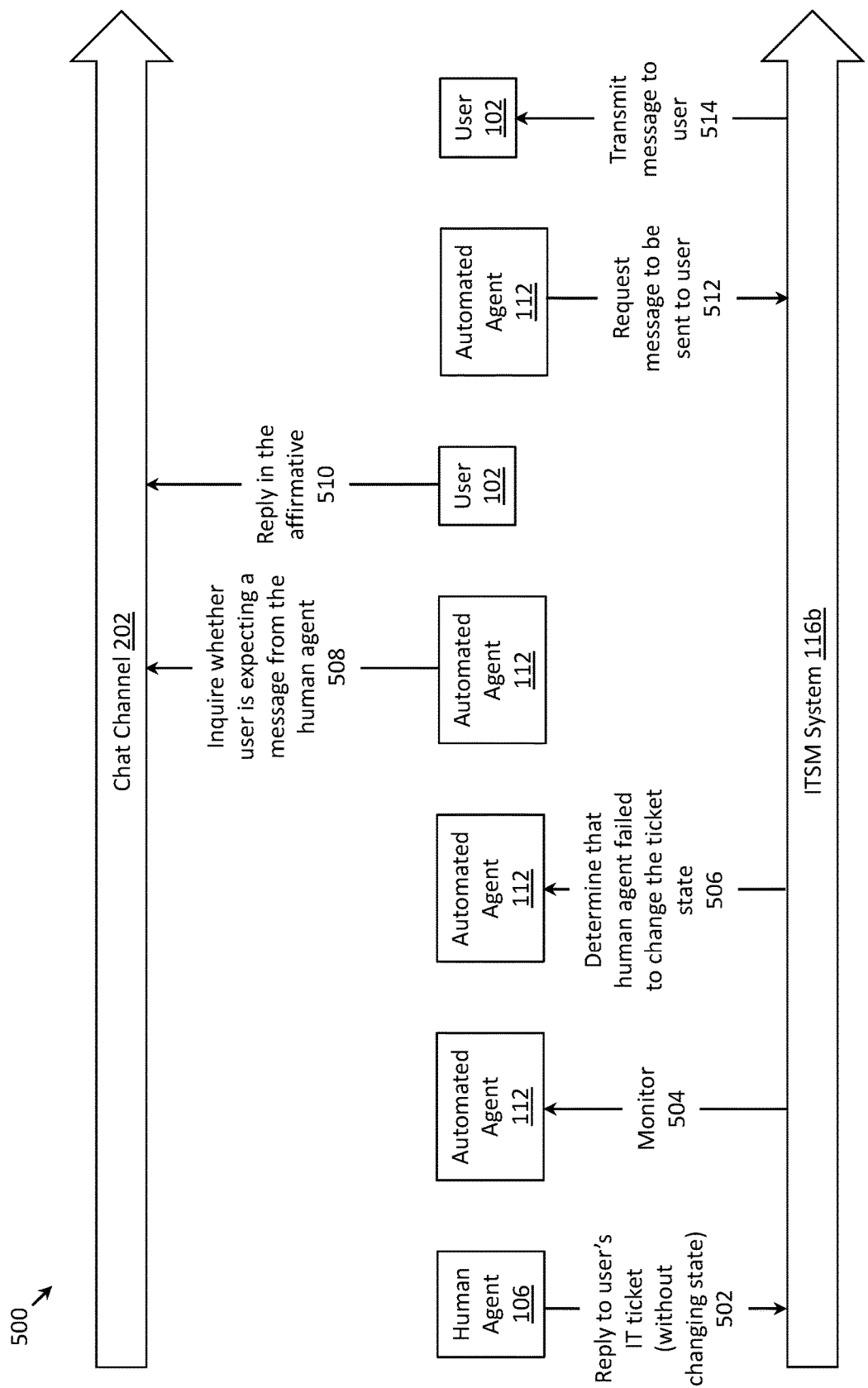
FIG. 5 depicts a sequence diagram in which an automated agent proactively inquires, on a chat channel, a user to determine whether he/she is expecting a message from a human agent, in response to identifying a message from the human agent that was received at the ITSM system but not transmitted from the ITSM system to the user, in accordance with one embodiment of the invention.

FIG. 5 depicts sequence diagram 500 in which automated agent 112 proactively inquires, on chat channel 202, user 102 to determine whether he/she is expecting a message from human agent 106, in response to identifying a message from human agent 106 that was received at ITSM system 116b, but not yet transmitted from ITSM system 116b to the user.

At step 502, human agent 106 may reply to the user's IT ticket without changing the ticket state. In such a scenario, the human agent's reply may be stored at ITSM system 116b, but failure to change the ticket state means that the human agent's reply has not been transmitted to user 102. Using the same example as discussed in FIG. 4, the IT ticket may be a request to purchase toner for a printer, and the human agent's reply may ask the user how soon the toner is needed. At step 504, automated agent 112 may monitor for indications of human-initiated activities on ITSM system 116b (e.g., a reply to an IT ticket from human agent 106).

At step 506, automated agent 112 may determine an L1 IT support issue based on the human agent's reply. More specifically, automated agent 112 may determine an intent and an entity associated with the human agent's reply with the assistance of an NLU. In the instant example, the intent again may be determined as "request shipping speed" and the entity may be determined as "printer supplies". In response to determining that the human agent failed to change the ticket state, automated agent 112 may determine the L1 information technology (IT) support issue of "unsent message" based on the determine intent and entity, and surrounding context of the human agent's reply. Here, the assistance of the NLU is important as automated agent 112 needs to be able to differentiate (i) a completed message of the human agent that was accidently not sent, from (ii) a draft message of the human agent that is still being prepared by the human agent. One way for automated agent 112 to discern between these two possibilities is based on the intent and entity determination of the NLU. If no intent and entity of the message from the human agent can be determined by the NLU, this determination may indicate that the message is not yet complete, whereas if an intent and entity can be determined, this determination may indicate that the message from the human agent is complete and can be transmitted to the user as is.

At step 508, automated agent 112 may post a message on chat channel 202 that inquires the user whether he/she is expecting a message from the human agent (e.g., in connection with ticket no. XYZ). At step 510, the user may reply in the affirmative. At step 512, automated agent 112 may transmit a request to ITSM system 116b requesting the human agent's message be transmitted to the user. At step 514, the human agent's message is transmitted to the user, and the resolution of the IT ticket can proceed in accordance with typical processes. The example of FIG. 5 illustrates that a chat channel can be used by an automated agent to alert a user of an unsent message for which the user is the intended recipient, and such message may be communicated via a communication channel separate from the chat channel. In the example of FIG. 5, it is also noted that no action from the human agent was necessary to address the human agent's failure to change the ticket state. In another embodiment (not depicted), it is possible that automated agent 112 could reach out to human agent 106 in chat channel 202 and check with the human agent on whether he/she accidentally forgot to change the ticket state, and resolve the IT support issue based on the human agent's response.

Figure 6:
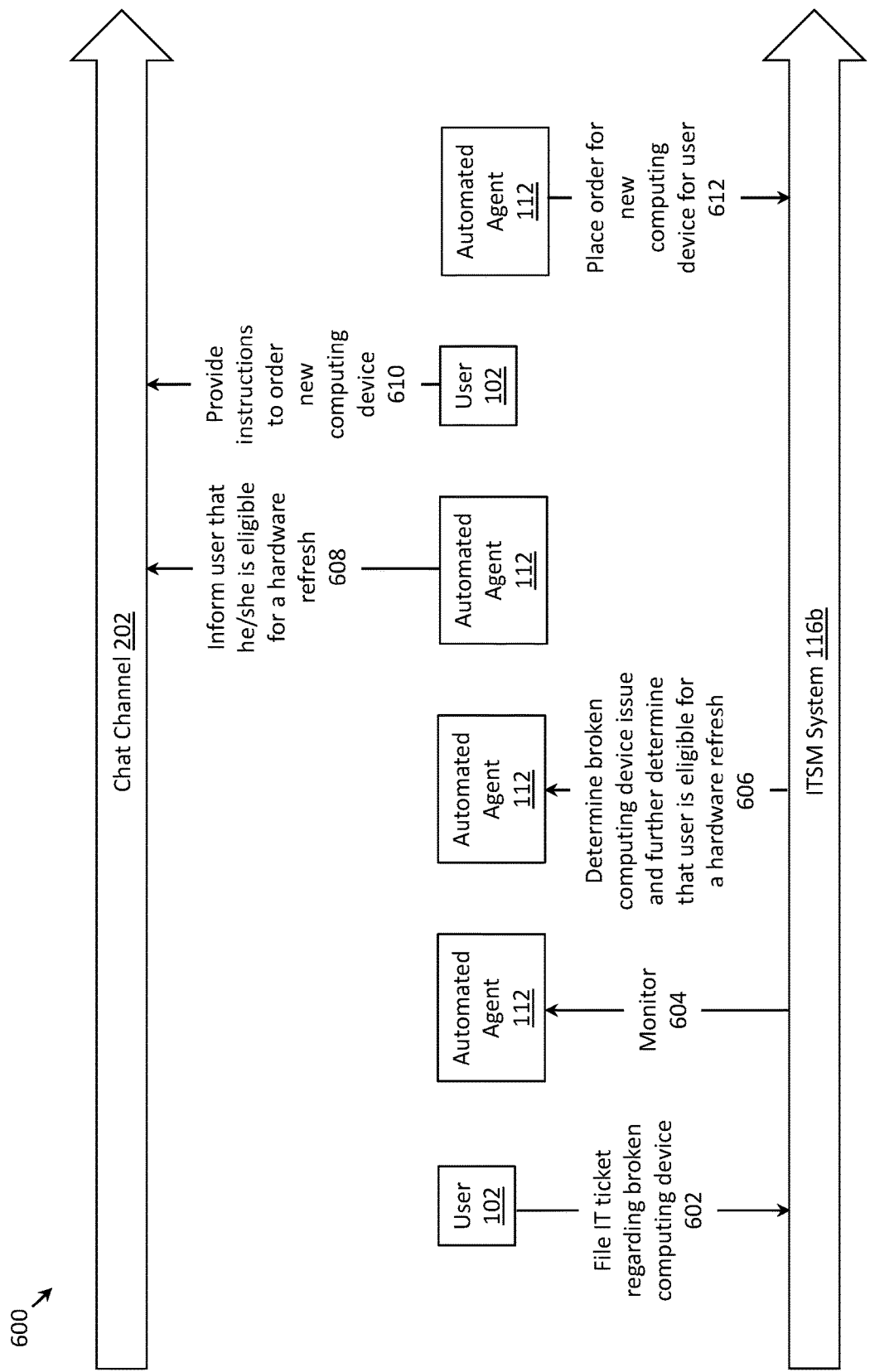
FIG. 6 depicts a sequence diagram in which an automated agent proactively alerts, on a chat channel, a user that he/she is eligible for a hardware refresh, in response to identifying a ticket at an ITSM system from the user regarding a broken computing device (e.g., a laptop), in accordance with one embodiment of the invention.

FIG. 6 depicts sequence diagram 600 in which automated agent 112 proactively alerts, on chat channel 202, user 102 that he/she is eligible for a hardware refresh, in response to identifying an IT ticket at ITSM system 116b from the user regarding a broken computing device (e.g., a laptop).

At step 602, user 102 may file an IT ticket regarding a broken computing device. For the sake of clarity, assume that the user 102 communicates this IT ticket to ITSM system 116b with his/her smartphone, since the user's laptop is broken. At step 604, automated agent 112 may monitor for indications of human-initiated activities on ITSM system 116b (e.g., an IT ticket from user 102).

At step 606, automated agent 112 may determine an L1 IT support issue based on the IT ticket. More specifically, automated agent 112 may determine an intent and an entity associated with the IT ticket with the assistance of an NLU. In the instant example, the intent may be determined as "troubleshooting" and the entity may be determined as "laptop". Based on such determined intent and entity, automated agent 112 may determine the L1 IT support issue of "troubleshooting a laptop". Further, based on user records stored at ITSM system 116b, automated agent 112 may additionally determine that user 112 is eligible for a hardware refresh (e.g., the user's current laptop is 2 years old, so the user is eligible for a new laptop).

At step 608, automated agent 112 may post a message on chat channel 202, informing the user that he/she is eligible for a new laptop, and inquiring the user whether he/she would like to address the laptop issue by replacing the laptop. At step 610, the user may provide instructions to place an order for a new laptop. At step 612, automated agent 112 may communicate with ITSM system 116b (or a purchasing department of an enterprise) to place an order for a new laptop for user 102. The example of FIG. 6 illustrates that a chat channel can be used by an automated agent to inform a user that he/she is eligible for a new laptop, in response to an IT ticket regarding a broken laptop being processed in a communication channel separate from the chat channel.

Figure 7:
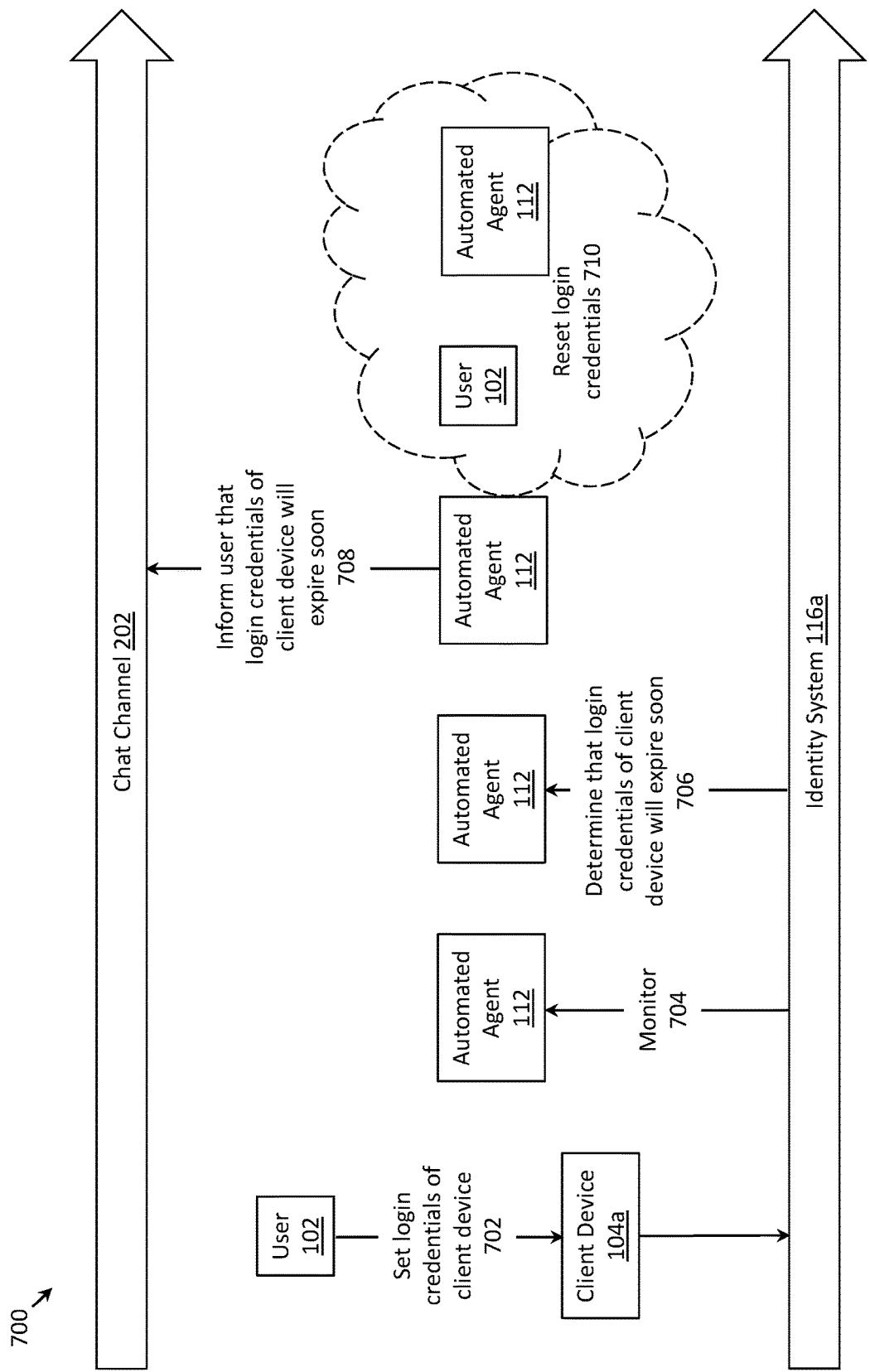
FIG. 7 depicts a sequence diagram in which an automated agent proactively alerts, on a chat channel, a user that a client device of the user has login credentials that will expire soon, in accordance with one embodiment of the invention.

FIG. 7 depicts sequence diagram 700 in which automated agent 112 proactively alerts, on chat channel 202, user 102 that client device 104a of the user has login credentials that will expire soon.

At step 702, user 102 may set login credentials for client device 104a (e.g., set password and/or user identifier). Further at step 702, a record of the new or updated login credentials may be stored at identity system 116a. At step 704, automated agent 112 may monitor for indications of human-initiated activities on identity system 116a (e.g., the new or updated login credentials).

At step 706, after a period of time (e.g., three months) has elapsed from step 702, automated agent 112 may determine that the login credentials of client device 104a will expire soon (e.g., will expire after 1 week) based on the monitored indications of human-initiated activities. At step 708, automated agent 112 may post a message on chat channel 202 informing the user that the login credentials of his/her client device will expire soon.

Assuming that the user would like to rely on the assistance of automated agent 112, the automated agent may assist the user to reset the login credentials for his/her client device (step 710). For example, the automated agent may provide the user with detailed instructions on the process to reset the login credentials. The example in FIG. 7 illustrates that a chat channel can be used by an automated agent to alert a user of expiring login credentials for a computing device, and further, the chat channel can be used by the automated agent to assist the user to reset the expiring login credentials.

Figure 8:
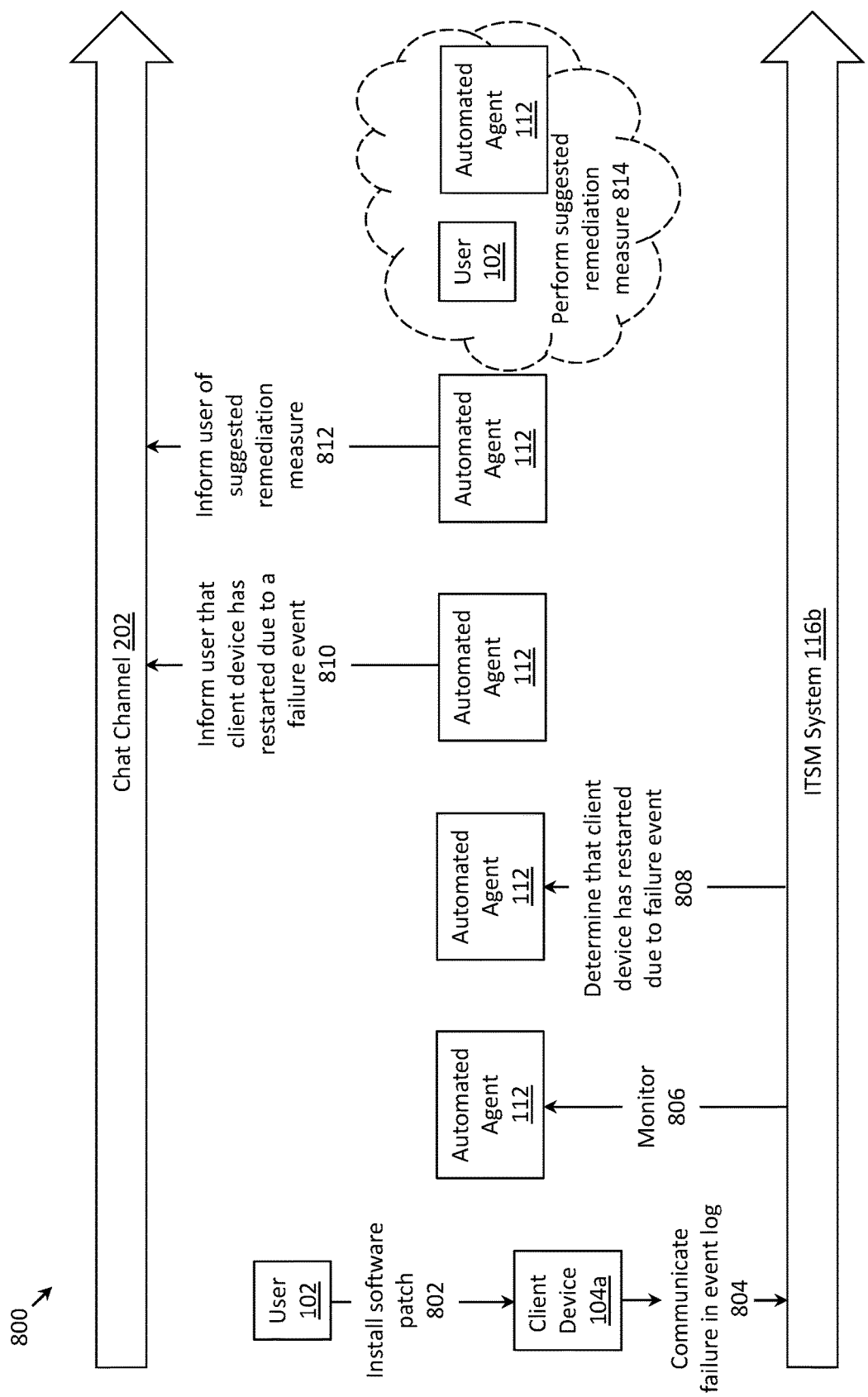
FIG. 8 depicts a sequence diagram in which an automated agent proactively alerts, on a chat channel, a user that a client device of the user has restarted due to a failure event, in response to identifying a failure of the device being recorded in an event log of an ITSM system, in accordance with one embodiment of the invention.

FIG. 8 depicts sequence diagram 800 in which automated agent 112 proactively alerts, on chat channel 202, user 102 that client device 102a of the user has restarted due to a failure event, in response to identifying a failure of the device being recorded in an event log of ITSM system 116b.

At step 802, user 102 (or human agent 106) may install a software patch 802 on client device 104a of user 102. The software patch may have a bug and may cause a failure event (e.g., memory overflow) of the client device 104a that results in the restarting of the client device. In the scenario being considered in the example of FIG. 8, assume that the failure event occurs in the overnight hours while the user is asleep, and occurs unbeknownst to the user. At step 804, the failure event is communicated to ITSM system 116b (e.g., automatically reported to ITSM system 116b as a result of the settings of the operating system on client device 104a).

At step 806, automated agent 112 may monitor for indications of human-initiated activities on ITSM system 116b (e.g., the failure of client device 104a stored in an event log). At step 808, automated agent 112 may determine that client device 104a has restarted due to a failure event based on monitoring the event log of ITSM system 116b. At step 810, automated agent 112 may post a message on chat channel 202 that informs the user that his/her client device has restarted due to a failure event. At this point, the user may be completely unaware that the client device has experienced a failure event and restarted. At step 812, automated agent 112 may post a message on chat channel 202 with a suggested remediation measure (e.g., re-install software patch). Assuming that the user desires the assistance of the automated agent, at step 814, automated agent 112 may assist user 102 to perform the remediation measure. In step 814, automated agent 112 and user 102 may communicate via chat channel 202 in order to perform the suggested remediation measure (not depicted). The example of FIG. 8 illustrates that a chat channel can be used by an automated agent to inform a user of a failure event of his/her client device that the user may be previously unaware of.

Figure 9:
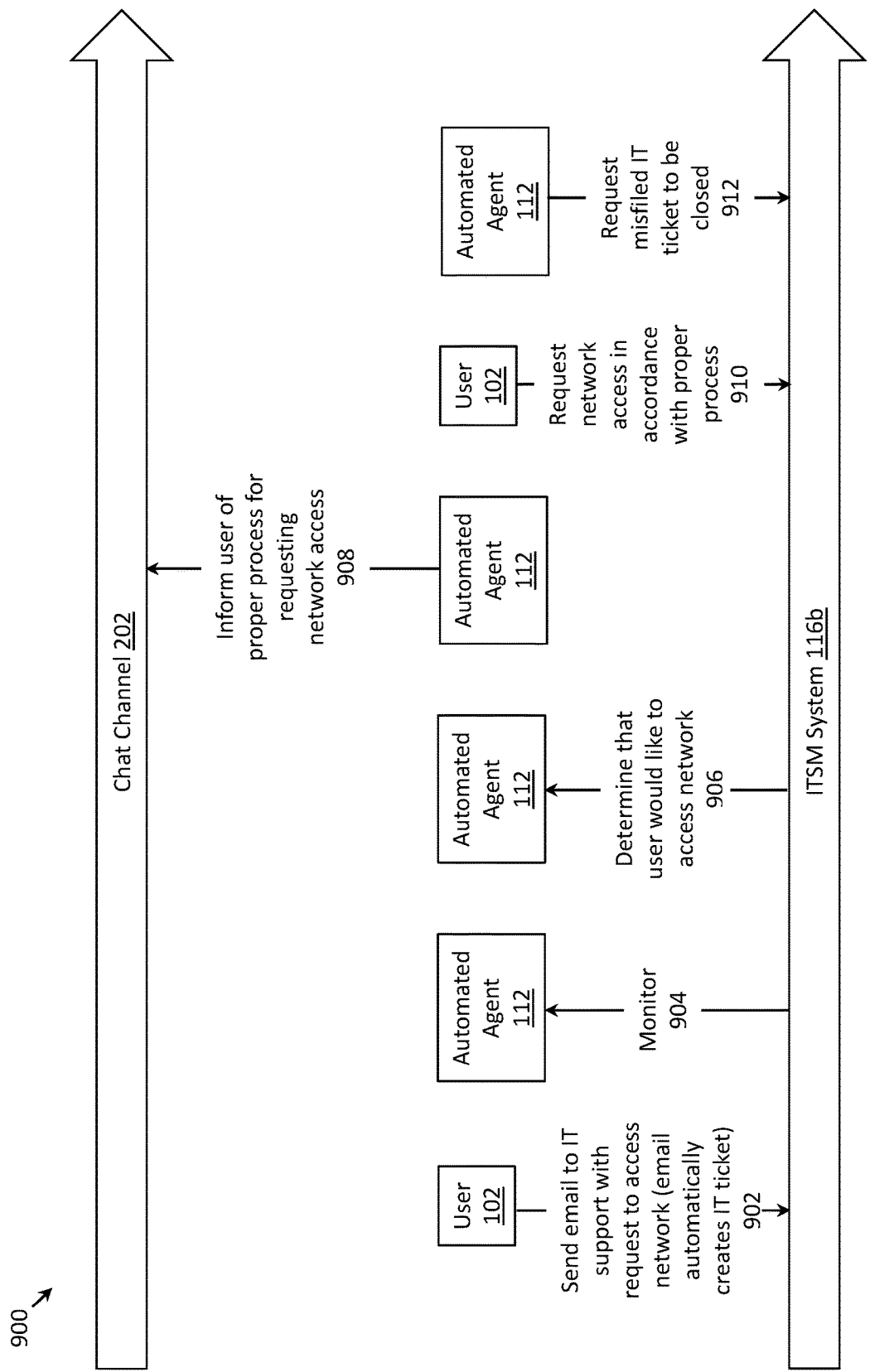
FIG. 9 depicts a sequence diagram in which an automated agent proactively alerts, on a chat channel, a user of a proper procedure for requesting network access, in response to identifying, on an ITSM system, an improper network access request from the user, in accordance with one embodiment of the invention.

FIG. 9 depicts sequence diagram 900 in which automated agent 112 proactively alerts, on chat channel 202, user 102 of a proper process for requesting network access, in response to identifying, on ITSM system 116b, an improper network access request from the user.

At step 902, user 102 may send an email to IT support with a request to join a network (e.g., a virtual private network). Further, the receipt of the email by the IT support may automatically cause an IT ticket to be created. At step 904, automated agent 112 may monitor for indications of human-initiated activities on ITSM system 116b (e.g., the email to IT support and the IT ticket).

At step 906, automated agent 112 may determine an intent and an entity associated with the user's email message to IT support with the assistance of an NLU. In the instant example, the intent may be determined as "provisioning" and the entity may be determined as "VPN". Based on such determined intent and entity, automated agent 112 may determine the L1 IT support issue of "provisioning user access to VPN". Further, based on enterprise-prescribed procedures stored at ITSM system 116b, automated agent may determine that the proper procedure for requesting access to the VPN is for the user to submit his/her network access request via a webform. Therefore, automated agent 112 may further determine that user 102 did not follow the proper procedures to request network access, and conclude that the IT ticket was generated unnecessarily.

At step 908, automated agent 112 may post a message on chat channel 202 that informs the user that he/she did not follow the proper procedures to request network access, and further may inform the user of the proper procedure for requesting network access (e.g., fill out a webform). At step 910, user 102 may request network access in accordance with the proper procedure. At step 912, automated agent 112 may transmit a request to ITSM system 116b requesting the misfiled ticket to be closed. The example of FIG. 9 illustrates that a chat channel can be used by an automated agent to redirect a network access request to the proper channels, potentially reducing the workload of the IT support staff.

Figure 10:
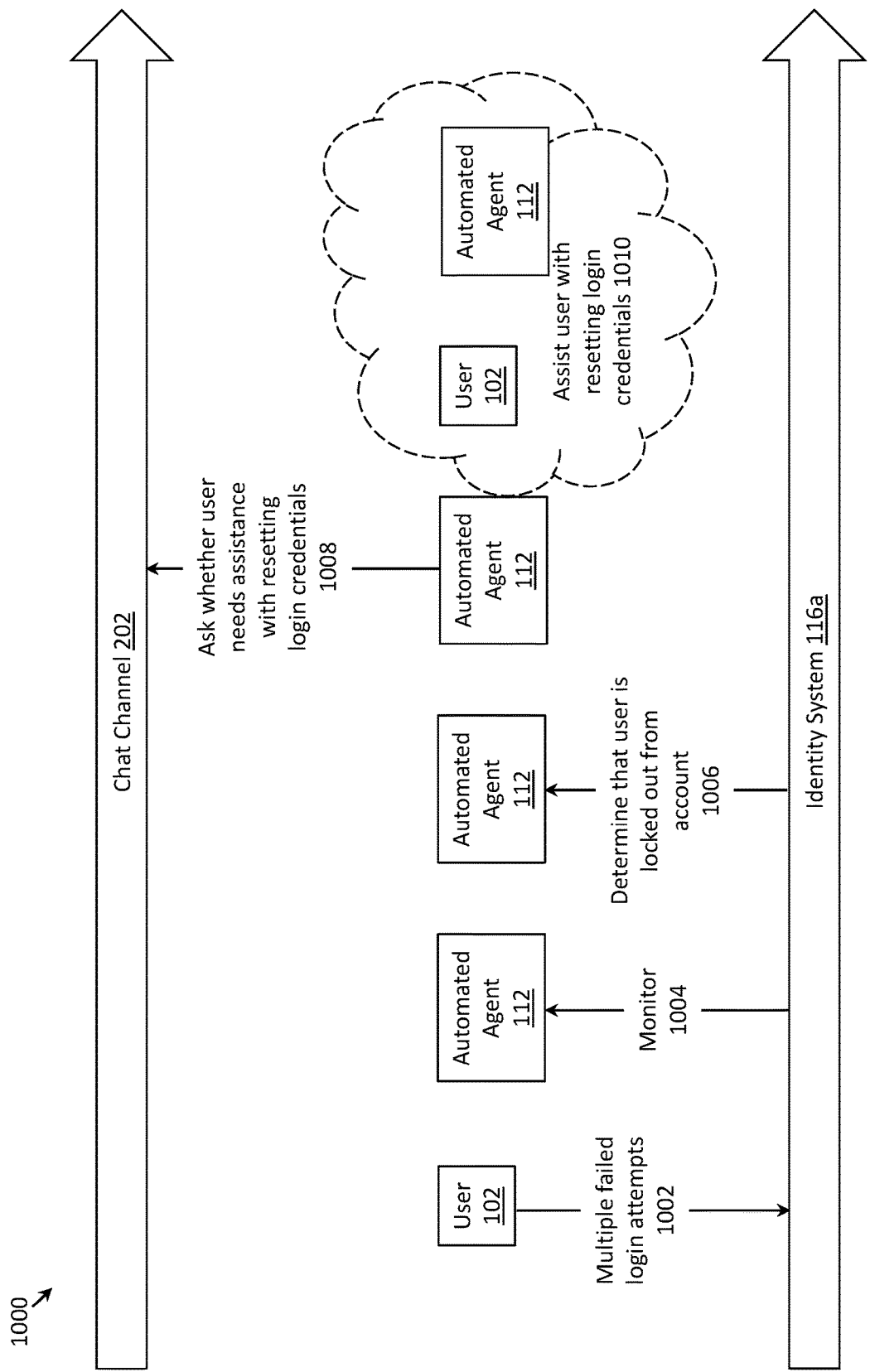
FIG. 10 depicts a sequence diagram in which an automated agent proactively reaches out, on a chat channel, to a user to assist the user to reset login credentials associated with an account, in response to detecting several failed login attempts by the user to login to the account, in accordance with one embodiment of the invention.
Figure 11:
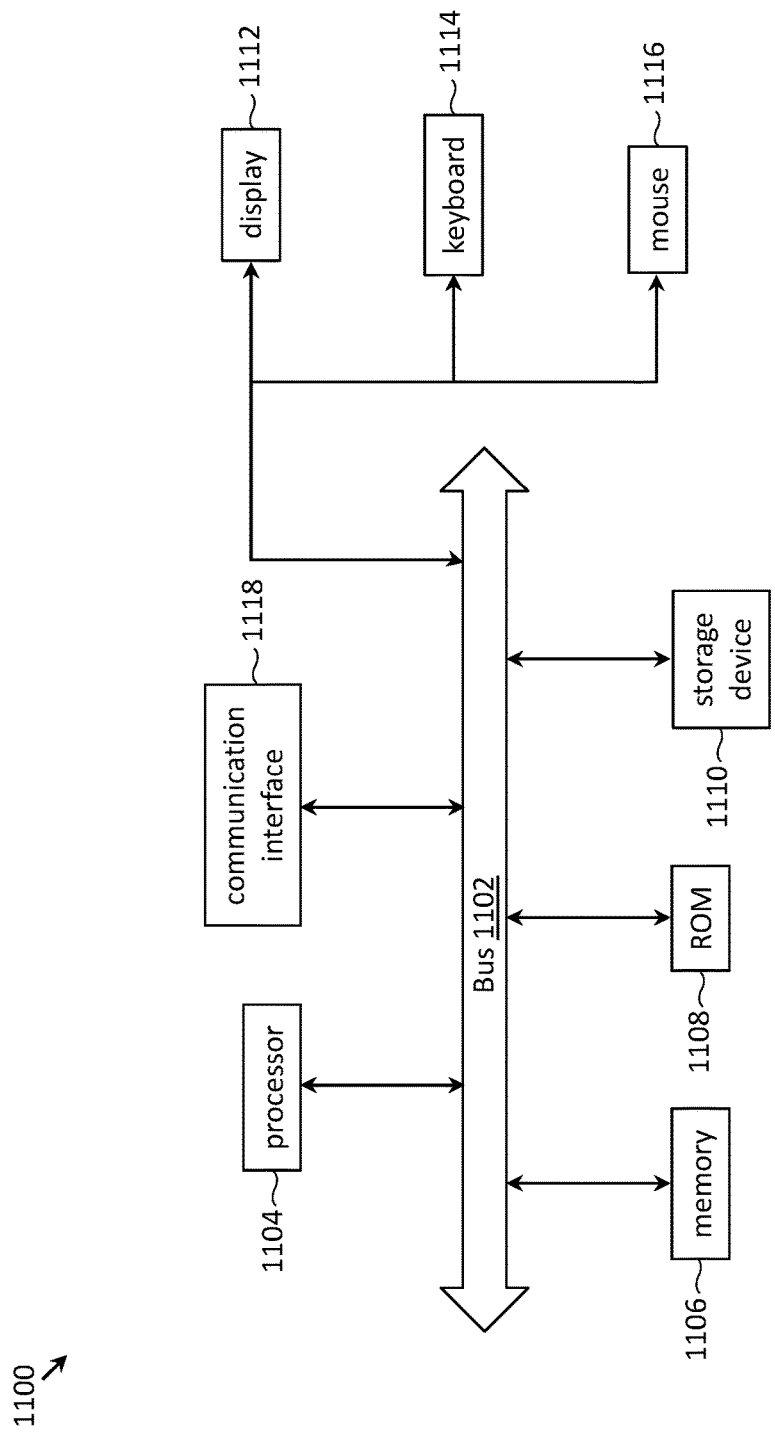
FIG. 11 depicts components of a computer system in which computer readable instructions instantiating the methods of the present invention may be stored and executed.

FIG. 10 depicts sequence diagram 1000 in which automated agent 112 proactively reaches out, on chat channel 202, to user 102 to assist the user to reset login credentials associated with an account, in response to detecting several failed login attempts by the user to login to the account.

At step 1002, user 102 may attempt, but fail, to login to an account (e.g., inputs the incorrect password several times). At step 1004, automated agent 112 may monitor for indications of human-initiated activities on ITSM system 116b (e.g., failed login attempts). At step 1006, automated agent 112 may determine that the user has been locked out from an account based on the failed login attempts.

At step 1008, automated agent 112 may post a message on chat channel 202 asking the user whether he/she needs help resetting the login credentials to his/her account. Assuming that the user replies in the affirmative, automated agent 112 may, in step 1010, assist the user with resetting his/her login credentials (e.g., by verifying an identity of the user by a means other than the login credentials, and providing the user with a webform for inputting new login credentials for the account). The example of FIG. 10 illustrates that a chat channel can be used by an automated agent to proactively reach out to a user who is locked out from an account. Further, the chat channel and potentially other channels (e.g., a webform) may be used to assist the user to reset his/her login credentials.

As is apparent from the foregoing discussion, aspects of the present invention involve the use of various computer systems and computer readable storage media having computer-readable instructions stored thereon. FIG. 10 provides an example of a system 1000 that may be representative of any of the computing systems (e.g., client devices 104, 108; servers 114, 118) discussed herein. Examples of system 1000 may include a smartphone, a desktop, a laptop, a mainframe computer, an embedded system, etc. Note, not all of the various computer systems have all of the features of system 1000. For example, certain ones of the computer systems discussed above may not include a display inasmuch as the display function may be provided by a client computer communicatively coupled to the computer system or a display function may be unnecessary. Such details are not critical to the present invention.

System 1000 includes a bus 1002 or other communication mechanism for communicating information, and a processor 1004 coupled with the bus 1002 for processing information. Computer system 1000 also includes a main memory 1006, such as a random access memory (RAM) or other dynamic storage device, coupled to the bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to the bus 1002 for storing static information and instructions for the processor 1004. A storage device 1010, for example a hard disk, flash memory-based storage medium, or other storage medium from which processor 1004 can read, is provided and coupled to the bus 1002 for storing information and instructions (e.g., operating systems, applications programs and the like).

Computer system 1100 may be coupled via the bus 1102 to a display 1112, such as a flat panel display, for displaying information to a computer user. An input device 1114, such as a keyboard including alphanumeric and other keys, may be coupled to the bus 1102 for communicating information and command selections to the processor 1104. Another type of user input device is cursor control device 1116, such as a mouse, a trackpad, or similar input device for communicating direction information and command selections to processor 1104 and for controlling cursor movement on the display 1112. Other user interface devices, such as microphones, speakers, etc. are not shown in detail but may be involved with the receipt of user input and/or presentation of output.

The processes referred to herein may be implemented by processor 1104 executing appropriate sequences of computer-readable instructions contained in main memory 1106. Such instructions may be read into main memory 1106 from another computer-readable medium, such as storage device 1110, and execution of the sequences of instructions contained in the main memory 1106 causes the processor 1104 to perform the associated actions. In alternative embodiments, hard-wired circuitry or firmware-controlled processing units may be used in place of or in combination with processor 1104 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1100 or similar electronic computing device, that manipulates and transforms data represented as physical (electronic) quantities within its registers and memories into other data similarly represented as physical quantities within its memories or registers or other such information storage, transmission or display devices.

Computer system 1100 also includes a communication interface 1118 coupled to the bus 1102. Communication interface 1118 may provide a two-way data communication channel with a computer network, which provides connectivity to and among the various computer systems discussed above. For example, communication interface 1118 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1100 can send and receive messages and data through the communication interface 1118 and in that way communicate with hosts accessible via the Internet. It is noted that the components of system 1100 may be located in a single device or located in a plurality of physically and/or geographically distributed devices.

Thus, an automated agent for proactively alerting a user of L1 IT support issues through chat-based communication has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   instantiating an automated agent on a computing device;
   monitoring, by the automated agent, a system of record instantiated on a computing system for any L1 information technology (IT) support issues affecting a user having records maintained by the system of record;
   in response to the monitoring of the system of record, determining, by the automated agent, a ticket from the user that specifies an issue with a client device of the user;
   upon determining the issue with the client device of the user, determining, by the automated agent, that the user is eligible for a hardware refresh that allows the user to replace the client device with a new client device; and
   proactively alerting, by the automated agent and via a chat channel, the user that the user is eligible for the hardware refresh,
   wherein the ticket is communicated to the system of record via a communication channel other than the chat channel.

2. The method of claim 1, further comprising, utilizing, by the automated agent, a natural language unit (NLU) to determine an intent and an entity associated with the ticket.

3. The method of claim 2, further comprising, determining, by the automated agent, the issue with the client device from the intent and the entity associated with the ticket.

4. The method of claim 1, further comprising receiving, by the automated agent, a message from the user to place an order for the new client device.

5. The method of claim 1, further comprising communicating, by the automated agent, with the system of record in order to place an order for the new client device.

6. The method of claim 1, wherein the system of record is instrumented to provide the automated agent with data signals that indicate changes occurring on the system of record.

7. The method of claim 1, wherein a monitoring agent is deployed behind a firewall protecting the system of record so as to monitor changes to the system of record.

8. The method of claim 1, wherein the system of record comprises an IT service management (ITSM) system.

9. A non-transitory computer readable storage medium comprising instructions that, when executed by a processor, cause the processor to:
   instantiate an automated agent on a computing device;
   monitor, by the automated agent, a system of record instantiated on a computing system for any L1 information technology (IT) support issues affecting a user having records maintained by the system of record;
   in response to the monitoring of the system of record, determine, by the automated agent, a ticket from the user that specifies an issue with a client device of the user;

upon determining the issue with the client device of the user, determine, by the automated agent, that the user is eligible for a hardware refresh that allows the user to replace the client device with a new client device; and proactively alert, by the automated agent and via a chat channel, the user that the user is eligible for the hardware refresh, wherein the ticket is communicated to the system of record via a communication channel other than the chat channel.

10. The non-transitory computer readable storage medium of claim 9, further comprising instructions that cause the processor to utilize a natural language unit (NLU) to determine an intent and an entity associated with the ticket.

11. The non-transitory computer readable storage medium of claim 10, further comprising instructions that cause the processor to determine the issue with the client device from the intent and the entity associated with the ticket.

12. The non-transitory computer readable storage medium of claim 9, further comprising instructions that cause the processor to receive a message from the user to place an order for the new client device.

13. The non-transitory computer readable storage medium of claim 9, further comprising instructions that cause the processor to communicate with the system of record in order to place an order for the new client device.

14. A computing device comprising a processor and memory storing instructions that, when executed by the processor, cause the processor to:

instantiate an automated agent on the computing device;

monitor, by the automated agent, a system of record instantiated on a computing system for any L1 information technology (IT) support issues affecting a user having records maintained by the system of record;

in response to the monitoring of the system of record, determine, by the automated agent, a ticket from the user that specifies an issue with a client device of the user;

upon determining the issue with the client device of the user, determine, by the automated agent, that the user is eligible for a hardware refresh that allows the user to replace the client device with a new client device; and proactively alert, by the automated agent and via a chat channel, the user that the user is eligible for the hardware refresh, wherein the ticket is communicated to the system of record via a communication channel other than the chat channel.

15. The computing device of claim 14, further comprising instructions that cause the processor to utilize a natural language unit (NLU) to determine an intent and an entity associated with the ticket.

16. The computing device of claim 15, further comprising instructions that cause the processor to determine the issue with the client device from the intent and the entity associated with the ticket.

17. The computing device of claim 14, further comprising instructions that cause the processor to receive a message from the user to place an order for the new client device.

18. The computing device of claim 14, further comprising instructions that cause the processor to communicate with the system of record in order to place an order for the new client device.

19. The computing device of claim 14, wherein the system of record is instrumented to provide the automated agent with data signals that indicate changes occurring on the system of record.

20. The computing device of claim 14, wherein a monitoring agent is deployed behind a firewall protecting the system of record so as to monitor changes to the system of record.

* * * * *